United States Patent
Ishidoshiro

(10) Patent No.: US 8,477,753 B2
(45) Date of Patent: *Jul. 2, 2013

(54) WIRELESS LAN DEVICE

(75) Inventor: Takashi Ishidoshiro, Nagoya (JP)

(73) Assignee: Buffalo Inc., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/403,815

(22) Filed: Feb. 23, 2012

(65) Prior Publication Data

US 2012/0155451 A1    Jun. 21, 2012

Related U.S. Application Data

(63) Continuation of application No. 10/232,945, filed on Aug. 30, 2002, now Pat. No. 8,194,625.

(30) Foreign Application Priority Data

Jul. 1, 2002    (JP) .................................. 2002-192508

(51) Int. Cl.
*H04W 4/00* (2009.01)
*G06F 15/00* (2006.01)
*G06F 7/04* (2006.01)
*H04L 29/06* (2006.01)

(52) U.S. Cl.
USPC ................. 370/338; 370/395.53; 370/395.54; 709/225; 709/245; 713/154; 726/3

(58) Field of Classification Search
USPC ............... 370/315, 329, 338, 395.53, 395.54; 709/224–227, 245; 455/410–411; 726/3–4, 726/11–25; 713/151–154, 182–183; 380/247–250, 255–258, 270–274
See application file for complete search history.

(56) References Cited

U.S. PATENT DOCUMENTS

| | | | |
|---|---|---|---|
| 5,699,513 | A | 12/1997 | Feigen et al. |
| 6,044,402 | A | 3/2000 | Jacobson et al. |
| H2065 | H | 5/2003 | Hong et al. |
| 6,691,227 | B1 | 2/2004 | Neves et al. |
| 6,772,347 | B1 | 8/2004 | Xie et al. |
| 7,006,467 | B2 | 2/2006 | Anton et al. |
| 7,039,021 | B1 | 5/2006 | Kokudo |
| 7,058,973 | B1 | 6/2006 | Sultan |
| 7,127,524 | B1 | 10/2006 | Renda et al. |

(Continued)

FOREIGN PATENT DOCUMENTS

| | | |
|---|---|---|
| CN | 1339746 A | 3/2002 |
| JP | 7-87121 | 3/1995 |

(Continued)

OTHER PUBLICATIONS

Chinese Office Action dated May 13, 2005 from corresponding Chinese Application No. 03148376.3.

(Continued)

*Primary Examiner* — Habte Mered
(74) *Attorney, Agent, or Firm* — Beyer Law Group LLP

(57) ABSTRACT

The present invention provides a LAN device 20 having an internal function of controlling communication. A management representative of the LAN device 20 sets a protocol applicable for communication with regard to each of MAC addresses or IP addresses allocated to transmitter terminals and each of IP addresses allocated to receiver terminals. The LAN device transmits data in the case of the protocol applicable for communication, while not transmitting data in the case of any protocol inapplicable for communication.

37 Claims, 9 Drawing Sheets

U.S. PATENT DOCUMENTS

| | | |
|---|---|---|
| 7,143,438 B1 | 11/2006 | Coss et al. |
| 7,146,638 B2 | 12/2006 | Malcolm |
| 7,360,086 B1 | 4/2008 | Tsuchiya et al. |
| 7,386,876 B2 | 6/2008 | Kim |
| 7,472,191 B2 | 12/2008 | Stewart et al. |
| 7,818,565 B2 | 10/2010 | Miller et al. |
| 2002/0107961 A1 | 8/2002 | Kinoshita |
| 2002/0144156 A1 | 10/2002 | Copeland, III |
| 2002/0157007 A1 | 10/2002 | Sashihara |
| 2002/0159407 A1 | 10/2002 | Carrafiello et al. |
| 2002/0176426 A1 | 11/2002 | Asano et al. |
| 2003/0110379 A1 | 6/2003 | Ylonen et al. |

FOREIGN PATENT DOCUMENTS

| | | |
|---|---|---|
| JP | 08-204719 | 8/1996 |
| JP | 2000-261487 | 9/2000 |
| JP | 2001-285292 | 10/2001 |
| JP | 2001-320373 | 11/2001 |
| WO | WO02/11391 A2 | 2/2002 |
| WO | WO02/11391 A3 | 2/2002 |

OTHER PUBLICATIONS

Korean Office Action dated May 18, 2005 from Korean Application No. 10-2002-0054462—computerized English translation included.
"Wireless LAN for the New Year," Apr. 2002, e.Company Magazine.

Fig. 4

| MAC ADDRESS | IP ADDRESS |
|---|---|
| . . . | . . . |
| ○○○ | × × × × |
| . . . | . . . |

| PROTOCOL | PORT NO. |
|---|---|
| . . . | . . . |
| × × | ○○ |
| . . . | . . . |

| UPPER LAYER PROTOCOL | UPPER PORT NO. | LOWER LAYER PROTOCOL | LOWER PORT NO. |
|---|---|---|---|
| HTTP | 80 | ... | ... |
| SMTP | 25 | | |
| POP3 | 110 | | |
| ... | ... | | |

| UPPER LAYER PROTOCOL | UPPER PORT NO. | UPPER LAYER WAN PROTOCOL | UPPER WAN PORT No. | LOWER LAYER PROTOCOL | LOWER PORT No. | LOWER LAYER WAN PROTOCOL | LOWER WAN PORT NO. |
|---|---|---|---|---|---|---|---|
| HTTP | 80 | HTTP | 80 | ... | ... | HTTP | 80 |
| SMTP | 25 | SMTP | 25 |  |  | ... | ... |
| POP3 | 110 | POP3 | 110 |  |  |  |  |
| ... | ... | FTP | 21 |  |  |  |  |
|  |  | ... | ... |  |  |  |  |

85

WIRELESS LAN DEVICE

CROSS REFERENCE TO RELATED APPLICATIONS

This application is a continuation of U.S. patent application Ser. No. 10/232,945 filed Aug. 30, 2002 in the name of Takashi Ishidoshiro and entitled "WIRELESS LAN DEVICE," which is incorporated herein by reference in its entirety and for all purposes.

BACKGROUND OF THE INVENTION

1. Field of the Invention

The present invention relates to a LAN device with which multiple clients are connected.

2. Description of the Related Art

In a network service based on the always-on connection as in the case of the Internet, a local area network (LAN) like an intranet is constructed in each facility, such as a company or a university campus. The LAN provides the environment of always-on connection with a wide area network (WAN) like the Internet via a router or a gateway. In such a LAN system, clients (computers or their users) that access the LAN can be specified. A LAN access service has been proposed recently to give permission of access to a LAN to unspecified clients. A LAN is constructed, for example, in a shop, and the users of the shop freely access the LAN to gain access to the external Internet. With recent advancement of wireless LAN, such a service is acceptable without connection of the computer to the network via cable.

A small-scaled LAN access service is readily constructed by utilizing a router for wireless LAN. A wireless LAN device is typically capable of connecting with several to ten-odd clients, and may further connect with several computers via cable. In one practical application, the wireless LAN device is installed in a small shop, such as a coffee shop or a beauty shop. A computer connected to the wireless LAN device via cable is used as a management server for controlling the LAN, and wireless access is permitted to the users of the shop.

Ensured security is an important issue in such LAN access service. In the general intranet, clients that access the intranet are relatively fixed, and a representative manager identifies users of the intranet. Each device that accesses the LAN is identified with an MAC address uniquely allocated to the device. It is accordingly easy to set permission and prohibition to each specific service. In the LAN access service, on the other hand, clients that access the LAN are unspecified, and management with MAC addresses is impractical. Non-limitation of access, however, enables each client to access data even in the management server, which may cause troubles.

One possible measure to this problem locates the management server in a different network from the LAN for the LAN access service. Another possible measure provides a VLAN switch or a firewall at a point of connection of the management server with the LAN. These measures, however, require additional equipment and are against the recent trend of providing the easy, small-scaled LAN access service.

SUMMARY OF THE INVENTION

The object of the present invention is thus to solve the drawbacks discussed above and to provide a LAN device that fulfills two requirements, that is, easy access to the LAN device and ensured security.

In order to attain at least part of the above and the other related objects, the present invention is directed to a LAN device that connects with multiple clients to construct a LAN. The LAN device includes: a communication reception module that receives a requirement of communication transmitted from each of the multiple clients to another client in the LAN or to another network; a registration module that registers a specified client among the multiple clients of the LAN; a decision module that determines whether or not the requirement of communication requests communication to the specified client; and a restriction module that, when the decision module determines that the requirement of communication requests communication to the specified client, restricts a protocol of the communication so as to limit the communication.

The arrangement of the invention ensures restriction of access from a terminal belonging to the LAN to a predetermined terminal. Changing the specification of the restriction of the protocol according to the terminal that transmits the requirement of communication attains diverse restrictions of access. Changing the specification of the restriction of the protocol according to the terminal that is the target of the requirement of communication also attains diverse restrictions of access.

BRIEF DESCRIPTION OF THE DRAWINGS

FIG. 4 shows contents of a trader database 75;

FIG. 5 shows contents of a transmission database 85 in a first embodiment;

FIG. 7 shows contents of the transmission database 85 in a second embodiment;

FIG. 9 shows contents of the transmission database 85 in a third embodiment.

DESCRIPTION OF THE PREFERRED EMBODIMENTS

First Embodiment (1) Construction

Figure 1:
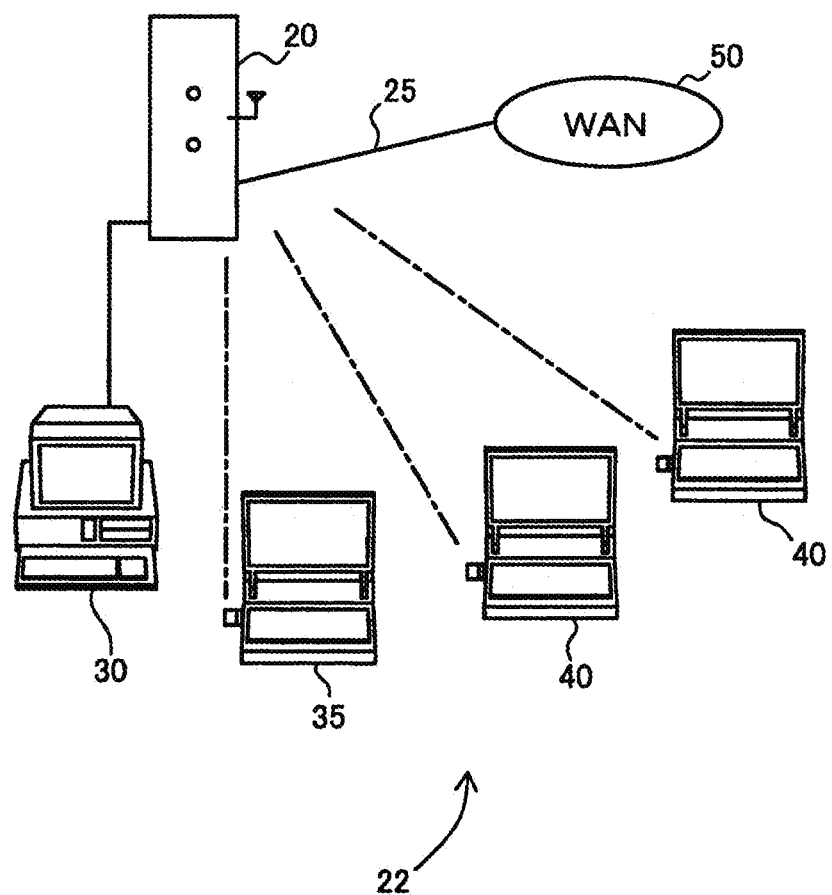
FIG. 1 illustrates a LAN access system 22.

One mode of carrying out the present invention is described below with reference to the drawings. FIG. 1 schematically illustrates the general construction of a system for providing LAN access service (hereafter referred to as LAN access system 22). The LAN access service provides an environment of attaining connection between a LAN constructed by a LAN device 20 with a WAN 50. The LAN access system 22 includes the LAN device 20, a management server 30, a trader client 35, and general clients 40. The management server 30 represents a terminal used to manage the LAN access system 22. The trader client represents a terminal of a trader, such as a coffee shop or a beauty shop, that provides the LAN access system 22, and is used by the trader to gain access to the WAN 50 via the LAN access system 22. The general client represents a terminal of each user who utilizes the LAN access system 22. The management server 30, the trader client 35, and the general clients 40 are generically called LAN access terminals. All of the LAN access terminals belong to an identical physical segment.

The LAN device 20 connects with a provider via an ADSL line 25 and further with the WAN 50 via the provider. Each of the LAN access terminals connects with the LAN device 20 by air or via cable to access the WAN 50 via the LAN device 20. The LAN device 20 also enables mutual communication between LAN access terminals. TCP/IP is applied for a protocol of communication. The IP protocol is used on the network layer, and the TCP protocol is used on the transport layer. Fixed private IP addresses are allocated to the management server 30 and the trader client 35, whereas private IP addresses are dynamically allocated to the general clients 40 by the LAN device 20. The LAN device 20 converts each private IP address into a global IP address in communication of the LAN access terminal with the WAN 50.

Figure 2:
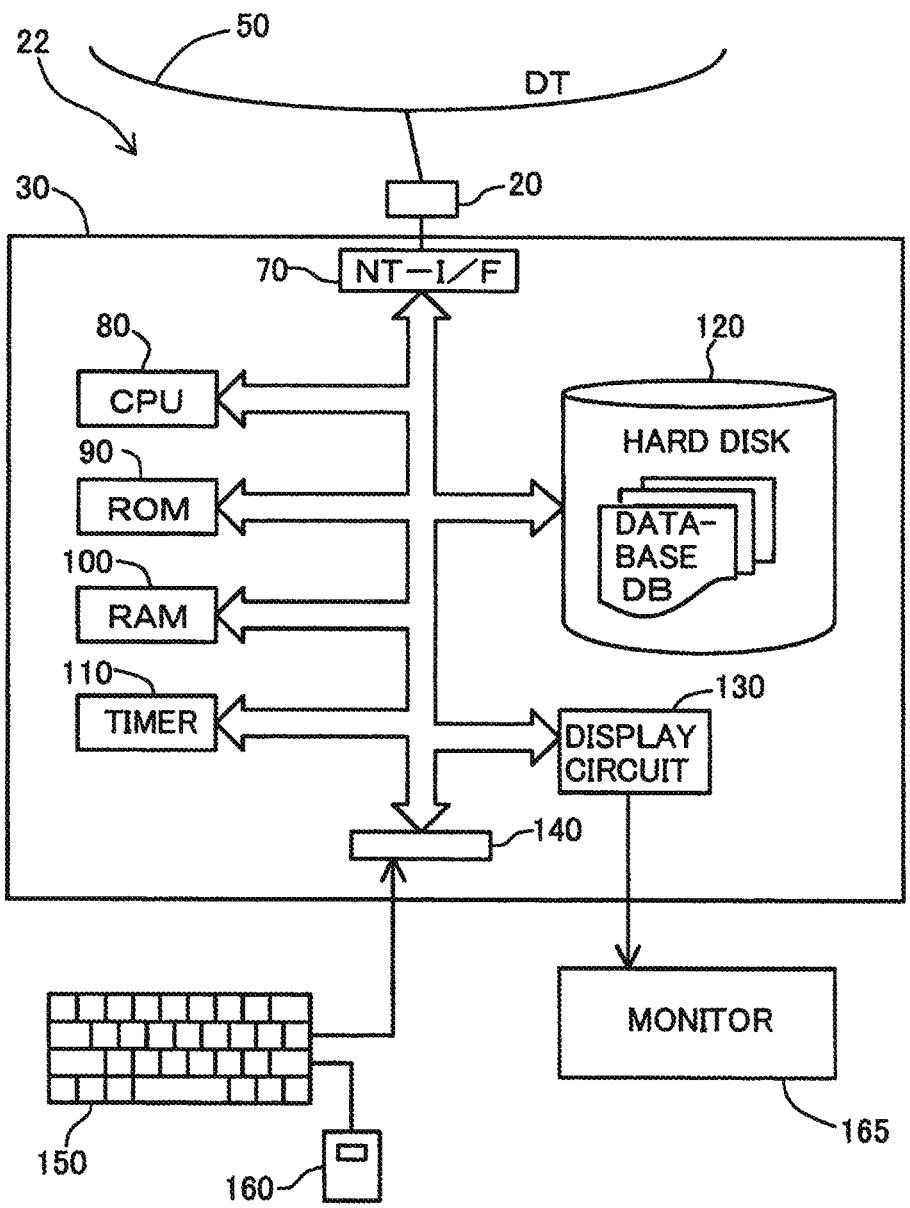
FIG. 2 shows the internal structure of a management server 30.

The internal structure of the management server 30 is discussed with reference to FIG. 2. The management server 30 includes a network interface (NT-I/F) 70 that controls data transmission to and from the WAN 50 via the LAN device 20, a CPU 80 that executes diverse series of processing, a ROM 90 that stores processing programs and static data, a RAM 100 that functions as a work area, a timer 110 that manages time, a display circuit 130 that is in charge of display on a monitor 165, a hard disk (HD) 120 that accumulates text data in the form of a database, and an input interface (I/F) 140 that works as an interface with a keyboard 150 and a mouse 160.

The hard disk 120 is illustrated as an internal element in this embodiment, but may be a removable external unit. A removable storage medium (for example, a CD-ROM, a CD-R, a CD-RW, a DVD-ROM, a DVD-RAM, or a flexible disk) may be used in addition to the hard disk 120. In the structure of the embodiment, the processing programs are stored in the ROM 90 of the management server 30. In another application, the processing programs are stored in the hard disk 120 and are extracted on the RAM 100 to be executed at the time of activation. The processing programs may otherwise be read from the removable storage medium or read from another terminal via the LAN device 20 to be executed. It is not required that all the required data are stored in the hard disk 120. Vast amounts of data may be stored in a distributive manner, updated, and managed by another terminal connected via the LAN device 20. Each of the trader client 35 and the general clients 40 has the internal structure practically similar to that of the management server 30.

Figure 3:
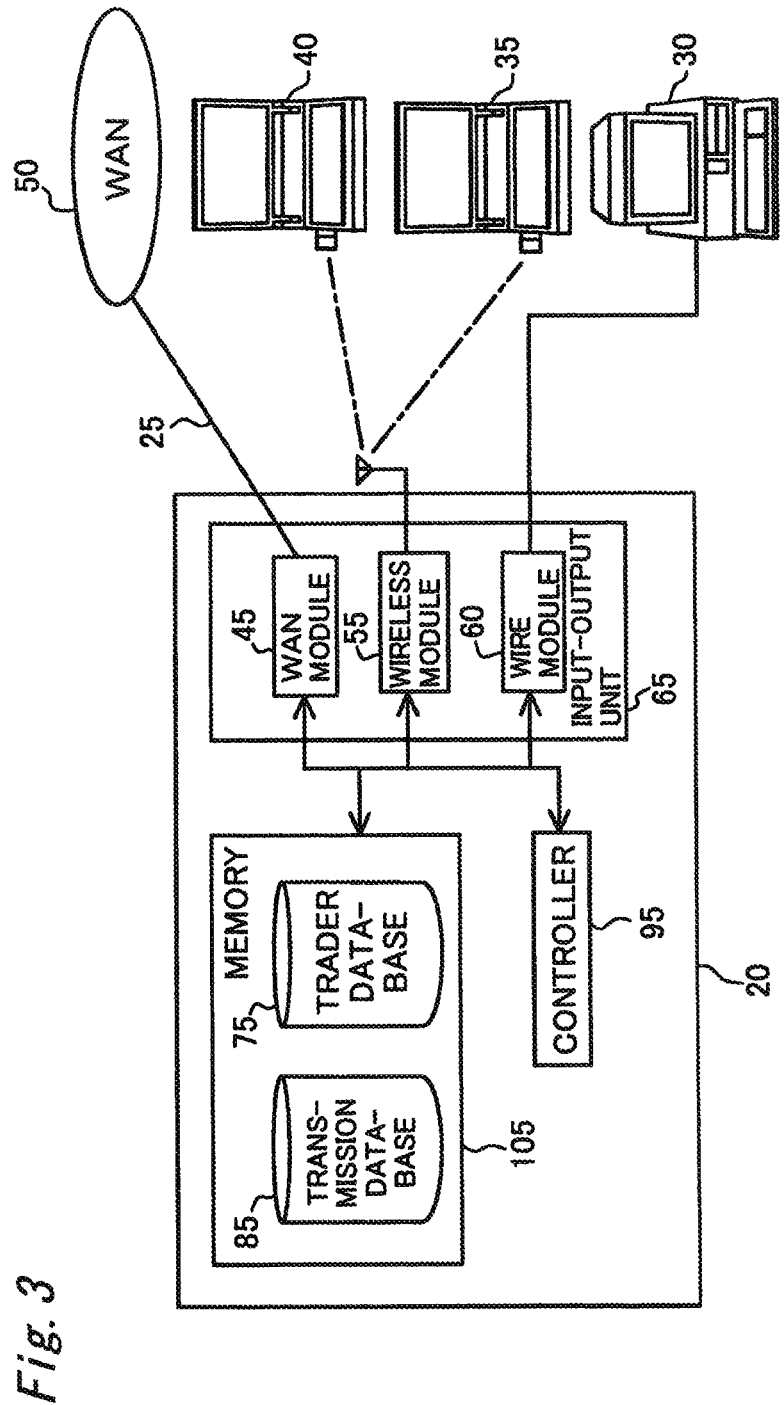
FIG. 3 shows the internal structure of a LAN device 20.

FIG. 3 shows the internal structure of the LAN device 20. The LAN device 20 includes a controller 95, a memory 105, and an input-output unit 65. Two databases used in this embodiment, that is, a trader database 75 and a transmission database 85, are stored in the memory 105. A password given to a management representative of the LAN access system 22 is required for registration and deletion of data into and from these databases. Only the management server 30 is allowed to manage these databases (for example, registration and deletion of data).

FIG. 4 shows contents of the trader database 75 as an example. The trader database 75 stores therein MAC addresses and IP addresses in the LAN, that is, private IP addresses, assigned to the management server 30 and the trader client 35.

FIG. 5 shows contents of the transmission database 85. The transmission database 85 stores therein protocols applicable for communication by the general clients 40. Each of the LAN access terminals in the LAN access system 22 uses one fixed port corresponding to one protocol. A mapping of protocols to port numbers is accordingly stored in the transmission database 85. The term 'protocol' in the following discussion represents a protocol on the application layer in the TCP/IP protocol. The input-output unit 65 shown in FIG. 3 includes a WAN module 45 that is in charge of input and output from and to the WAN 50, a wireless module 55 that is in charge of input and output of wireless communication, and a wire module 60 that is in charge of input and output of wired communication. The wireless module 55 and the wire module 60 are in charge of input and output from and to the LAN access terminals of the LAN access system 22. The controller 95 controls the internal operations of the LAN device 20.

(2) Processing

Figure 6:
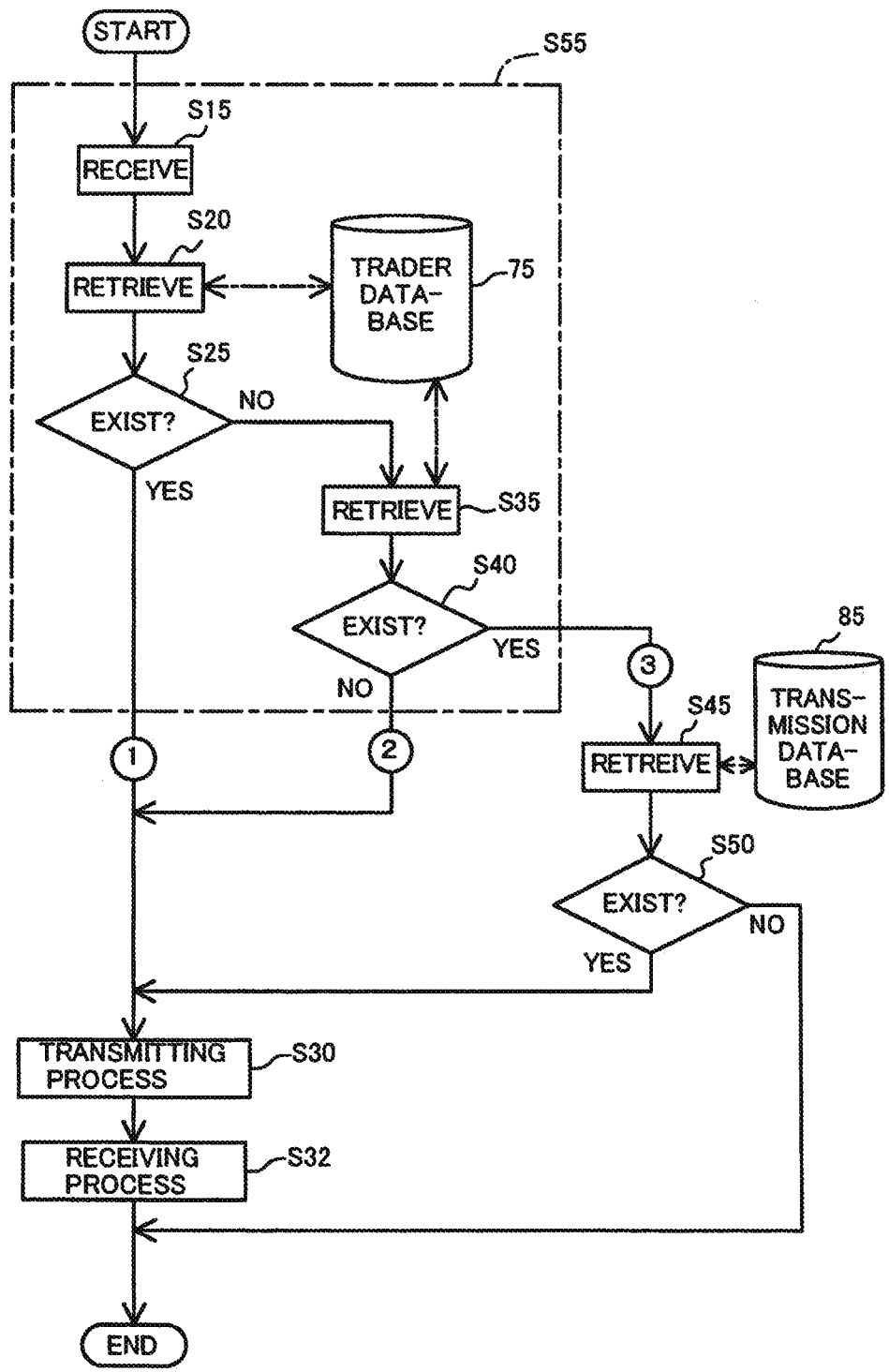
FIG. 6 is a flowchart showing a series of processing executed by the LAN device 20 in the first embodiment.

The following describes a series of processing executed by the LAN device 20 to restrict a protocol for communication from each of the LAN access terminals to the management server 30 or the trader client 35 in the first embodiment with reference to FIG. 6. When the wireless module 55 or the wire module 60 receives data (step S15), the LAN device 20 retrieves an MAC address field to the trader database 75 with an MAC address of a transmission source written in a header of the received data (step S20). When the corresponding MAC address exists (step S25), it means that the received data is a correspondence from either of the management server 30 and the trader client 35. In such cases, the received data is transmitted to an address of a terminal specified as a transmission target without any limitation to the protocol for communication (step S30). When the transmitted data is reply requirement data that requires a reply of data (for example, a URL in the Internet), reply data (data used to display a Web page corresponding to the URL in the above example) is transmitted in response to the reply requirement data. The LAN device 20 receives the reply data, and then transmits the received reply data to the address of the management server or the trader client that has output the reply requirement data (step S32).

When no corresponding MAC address exists in the trader database 75 (step S25), on the other hand, it means that the received data is correspondence from one of the general clients 40. The LAN device 20 subsequently retrieves an IP address field of the trader database 75 with an IP address of the transmission source written in the header of the received data (step S35). When no corresponding IP address exists (step S40), it means that the received data is data addressed to the WAN 50 or the general client 40 of the LAN access system 22. The received data is accordingly transmitted to the address of the terminal specified as the transmission target without any limitation to the protocol for communication (step S30). When the transmitted data is the reply requirement data, the LAN device 20 receives the reply data and transmits the received reply data to the address of the general client 40 that has output the reply requirement data (step S32).

When the corresponding IP address is present (step S40), it means that the received data is correspondence to either the management server 30 or the trader client 35. For restriction of the protocol, the LAN device 20 retrieves a port number field of the transmission database 85 with a port number written in the header of the received data (step S45). When no corresponding port number is present (step S50), it means that communication by the mapped protocol is prohibited. The received data is accordingly not transmitted, and the program exits from this processing routine. When the corresponding port number exists (step S50), on the contrary, the LAN device 20 transmits the received data to the address of the terminal specified as the transmission target (step S30). When the transmitted data is the reply requirement data, the LAN device 20 receives the reply data and transmits the received reply data to the address of the general client 40 that has output the reply requirement data (step S32).

The arrangement of the embodiment discussed above limits access of the general client 40 to the management server 30 or the trader client 35 without providing any additional equipment, such as another router or firewall in the system utilizing the LAN device 20.

Second Embodiment

A second embodiment is an example of the LAN access system 22 that changes the specification of the restriction of the protocol according to the type of the general client 40. The management representative of the LAN access system 22 classifies the general clients 40 into upper layer clients and lower layer clients. Stricter restriction of the protocol is applied to the lower layer clients, whereas eased restriction is applied to the upper layer clients. The upper layer clients are, for example, those who pay higher connection fees of the LAN access system 22 or affordable clients. The MAC address assigned to a network device mounted on each upper layer client is stored in an upper layer database 115 in the memory 105 included in the LAN device 20. The password of the management representative is required for such storage, and only the management server 30 is allowed to carry out the storage. In most cases, different protocols are applicable for the upper layer clients and the lower layer clients.

FIG. 7 shows contents of the transmission database 85 in the second embodiment. Upper layer protocols represent applicable protocols for communication of the upper layer clients with the management server 30 or the trader client 35. Upper port numbers represent preset port numbers used in communication by the upper layer protocol. Lower layer protocols represent applicable protocols for communication of the lower layer clients with the management server 30 or the trader client 35. Lower port numbers represent preset port numbers used in communication by the lower layer protocol.

Figure 8:
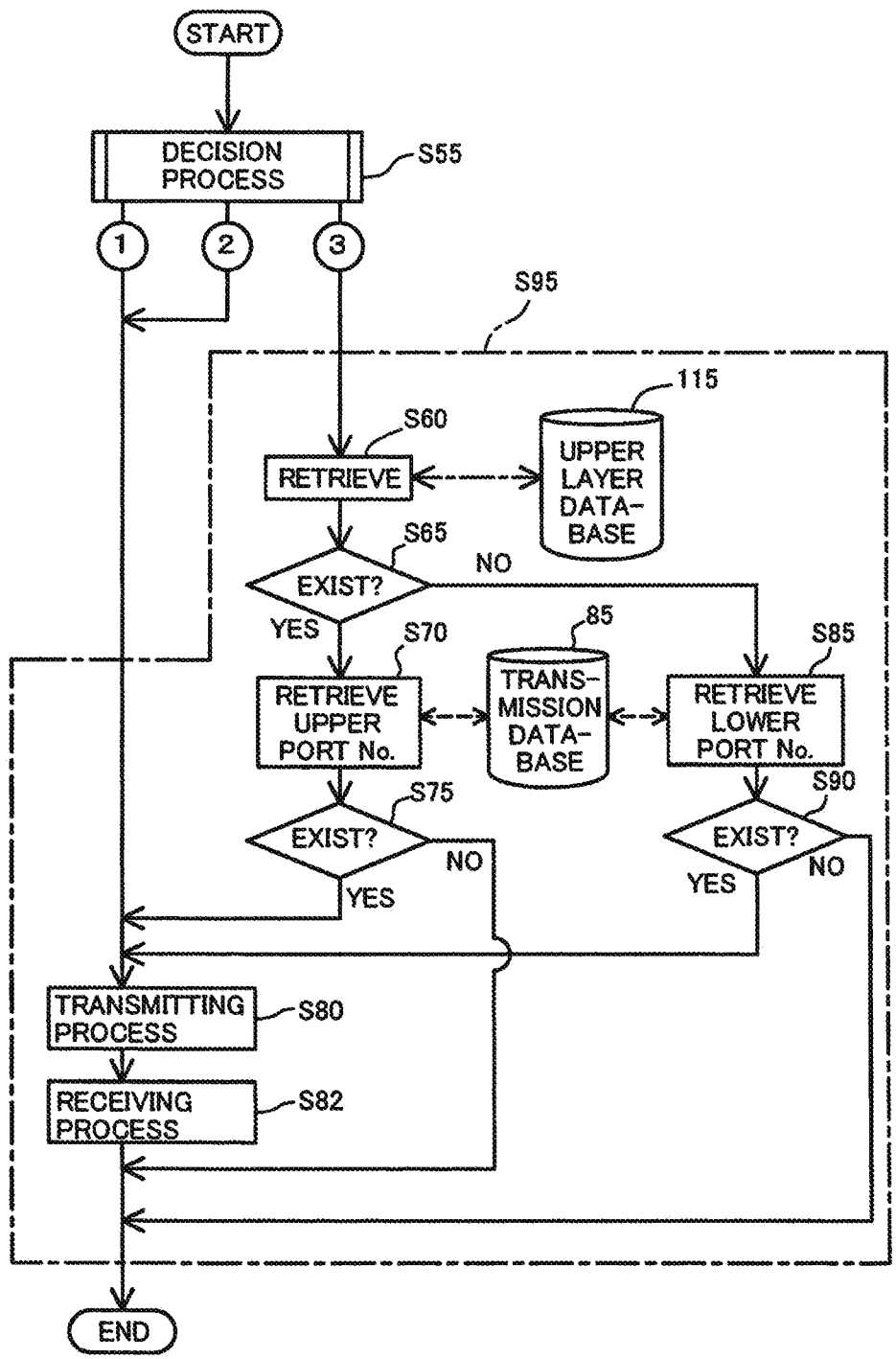
FIG. 8 is a flowchart showing a series of processing executed by the LAN device 20 in the second embodiment.

FIG. 8 is a flowchart showing a series of processing executed by the LAN device 20 in the second embodiment. When the result of the decision process (step S55) in the flowchart of FIG. 6 shows that the transmission target is either the management server 30 or the trader client 35 (in the case of (3) in FIG. 6), it is subsequently determined whether or not the general client 40 that has transmitted the received data is an upper layer client or a lower layer client. For this purpose, the LAN device 20 retrieves the upper layer database 115 with an MAC address assigned to the terminal of the transmission source and written in the header of the receive data (step S60).

When the corresponding MAC address is present in the upper layer database 115, that is, when the terminal of the transmission source is an upper layer client (step S65), the LAN device 20 retrieves an upper port number field of the transmission database 85 with a port number written in the header of the received data (step S70). When no corresponding port number is present (step S75), it means that communication by the mapped protocol is prohibited. The received data is accordingly not transmitted, and the program exits from this processing routine. When the corresponding port number is present (step S75), on the contrary, the LAN device 20 transmits the received data to the address of the terminal specified as the transmission target (step S80). When the transmitted data is the reply requirement data, the LAN device 20 receives the reply data and transmits the received reply data to the address of the upper layer client that has output the reply requirement data (step S82).

When no corresponding MAC address is present in the upper layer database 115, that is, when the terminal of the transmission source is a lower layer client (step S65), on the other hand, the LAN device 20 retrieves a lower port number field of the transmission database 85 with a port number written in the header of the received data (step S85). When no corresponding port number is present (step S90), it means that communication by the mapped protocol is prohibited. The received data is accordingly not transmitted, and the program exits from this processing routine. When the corresponding port number is present (step S90), on the contrary, the LAN device 20 transmits the received data to the address of the terminal specified as the transmission target (step S80). When the transmitted data is the reply requirement data, the LAN device 20 receives the reply data and transmits the received reply data to the address of the lower layer client that has output the reply requirement data (step S82).

The arrangement of the second embodiment discussed above has the similar functions and effects to those of the first embodiment. Additionally classification of the general clients 40 and individual specification of the protocols applicable for the classified general clients 40 enables the security level to the management server 30 or the trader client 35 to be set in several stages.

Third Embodiment

The structure of a third embodiment restricts communication with the WAN 50, as well as communication with the management server 30 or the trader client 35. FIG. 9 shows contents of the transmission database 85 in the third embodiment. Upper layer WAN protocols represent applicable protocols for communication of the upper layer clients with the WAN 50. Upper WAN port numbers represent preset port numbers used in communication by the upper layer WAN protocol. Lower layer WAN protocols represent applicable protocols for communication of the lower layer clients with the WAN 50. Lower WAN port numbers present preset port numbers used in communication by the lower layer WAN protocol.

Figure 10:
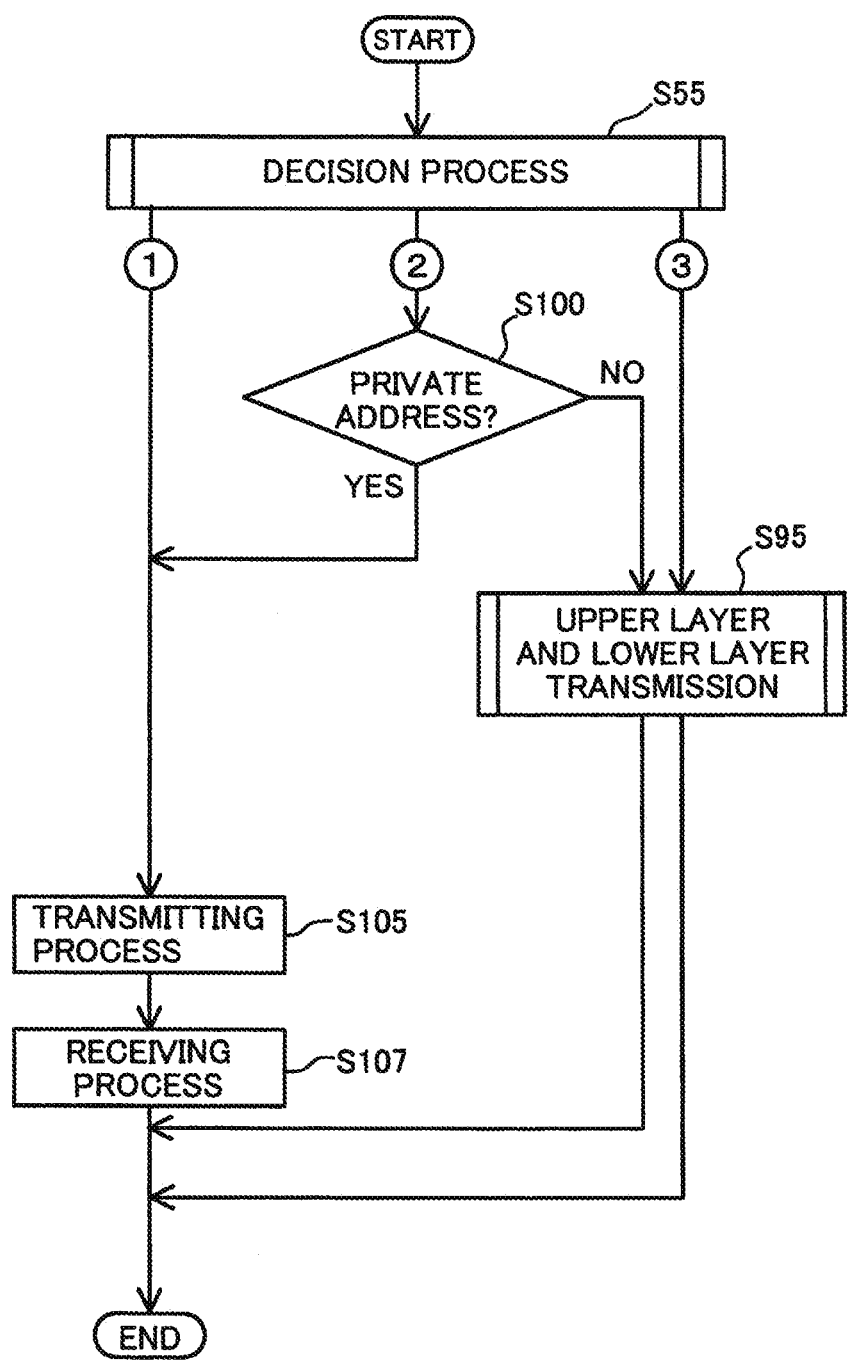
FIG. 10 is a flowchart showing a series of processing executed by the LAN device 20 in the third embodiment.

FIG. 10 is a flowchart showing a series of processing executed by the LAN device 20 in the third embodiment. When the result of the decision process (step S55) in the flowchart of FIG. 6 shows that the transmission target is neither the management server 30 nor the trader client 35 (in the case of (2) in FIG. 6), it is subsequently determined whether or not the IP address of the transmission target is a private IP address, that is, an IP address of the LAN access terminal (Step S95). In the case of a private IP address (step S100), the LAN device 20 transmits the received data to the address of the terminal specified as the transmission target without any restriction of the protocol (step S105). When the transmitted data is the reply requirement data, the LAN device 20 receives the reply data and transmits the received reply data to the address of the general client 40 that has output the reply requirement data (step S107). In the case of no private IP address (step S100), on the other hand, the upper layer-lower layer transmission process of the second embodiment (step S95) is carried out. In the process of retrieval of the transmission database in the upper layer-lower layer transmission process, the upper WAN port number is retrieved for the upper layer client and the lower WAN port number is retrieved for the lower layer client.

The arrangement of the third embodiment has the similar functions and effects to those of the first embodiment and the second embodiment, and additionally ensures limitation of communication with the WAN 50.

The above embodiments and their applications are to be considered in all aspects as illustrative and not restrictive. There may be many modifications, changes, and alterations without departing from the scope or spirit of the main characteristics of the present invention. For example, in the case of communication from the LAN access terminal to the management server 30 or the trader client 35, one applicable procedure distinguishes the management server 30 from the trader client 35 and sets different protocols for communication. This is effective for the requirement of different settings to the management server 30 and to the trader client 35.

The technique of the present invention is applicable to restriction of the protocol for mutual communication between the general clients 40. This is effective for the requirement of limiting mutual access to the general clients 40. In the above embodiments, the protocols are classified into two groups. This arrangement is, however, not restrictive, and the protocols may be classified into a greater number of groups according to the type of the LAN access terminals.

In the second and the third embodiments, the upper layer clients are stored in the form of the upper layer database. This construction is, however, not restrictive. The lower layer clients may alternatively be stored in the form of a lower layer database. The database may store specific information, which allows classification of the LAN access terminals into a greater number of groups.

The invention claimed is:

1. A wireless LAN device that connects with multiple clients to construct a wireless LAN, said wireless LAN device comprising:
   a processor that executes computer codes;
   an input-output circuit that receives communication transmitted from any one of the multiple clients of the wireless LAN to another client in the wireless LAN, or to another network, the wireless LAN device operating as the access point to provide wireless LAN access service in a local area such that each wireless client in the wireless LAN communicates via the wireless LAN device;
   a communication reception computer code for receiving, via the input-output circuit, a request for communication transmitted from any one of the multiple clients of the wireless LAN to another client in the wireless LAN or to another network;
     a registration computer code for registering a specified client among the multiple clients of the wireless LAN as a registered specific client;
     a decision computer code for determining whether or not the request for communication is directed to the registered specified client; and
     a restriction computer code for restricting communication between clients within the wireless LAN via the communication reception computer code based on a protocol used for the communication, the restriction computer code permitting the communication from one of the multiple clients to the registered specified client for a protocol used for the communication being a specific protocol and rejecting the communication from the same one of the multiple clients to the registered specified client for other protocols so as to limit the communication within the wireless LAN when it is determined that the request for communication is directed to the registered specified client, and so as not to restrict the communication when said decision module determines that the request for communication is not directed to the registered specified client, wherein:
     (a) if a source MAC address is of the registered specific client, then the communication is permitted without any restrictions; and
     (b) if the source MAC address is not of the registered specific client, judging whether a destination IP address if of the registered specific client or not, including:
       (1) if the destination IP address is of the registered specific client, the communication is permitted only when the communication is by the permitted protocol; and
       (2) if the destination IP address is not of the registered specific client, the communication is permitted without any restrictions.

2. A wireless LAN device in accordance with claim 1, wherein said registration computer code registers the specified client with an IP address allocated thereto, and
   said decision computer code carries out the determination with an IP address recorded with the requirement of communication.

3. A wireless LAN device in accordance with claim 1, further comprising:
   a determination computer code for determining whether or not the client that has transmitted the requirement of communication has been registered in advance,
     wherein said restriction computer code changes a specification of the restriction of the protocol according to a result of the determination carried out by said determination computer code.

4. A wireless LAN device in accordance with claim 3, wherein said determination computer code carries out the determination with a MAC address allocated to a network device mounted on the client.

5. A wireless LAN device in accordance with claim 3, wherein said determination computer code carries out the determination with an IP address allocated to the client.

6. A wireless LAN device in accordance with claim 1, said LAN device further comprising:
   a WAN restriction computer code that, when the requirement of communication requests communication to another network, restricts the protocol of the communication so as to limit the communication.

7. A wireless LAN device in accordance with claim 6, further comprising:
   a determination computer code for determining whether or not the client that has transmitted the requirement of communication has been registered in advance,
     wherein said WAN restriction computer code changes a specification of the restriction of the protocol according to a result of the determination carried out by said determination computer code.

8. A wireless LAN device in accordance with claim 1, wherein the restriction of the protocol is implemented by limiting a protocol applicable for communication.

9. The wireless LAN device of claim 1, wherein the wireless LAN device stores at least a MAC address for the registered specific client, the decision computer code and the restriction computer code utilizing at least the MAC address to determine communication privileges in the wireless LAN with a client not having a stored MAC address having the lowest level of communication privileges and a client having a stored MAC address having a higher level of communication privileges.

10. The wireless LAN device of claim 9, wherein a client with the lowest level of communication privileges is restricted from communicating with at least a management server but is permitted communication with at least other clients having the lowest level of communication privileges.

11. The wireless LAN device of claim 10, wherein a client with the lowest level of communication privileges has at least one additional restriction on its communication privileges.

12. The wireless LAN device of claim 10, where only a client with a highest level of communication privileges has access to a management server.

13. The wireless LAN device of claim 12, wherein at least one client with a pre-registered MAC address has communication privileges intermediate between the lowest level and the highest level.

14. The wireless LAN device of claim 1, wherein the wireless LAN device stores at least one type of address information for the registered specific client, the decision computer code and the restriction computer code utilizing the address information to determine communication privileges in the wireless LAN with a client not having stored address information having the lowest level of communication privileges and a client having a stored address having a higher level of communication privileges.

15. The wireless LAN device of claim 14, wherein a client with the lowest level of communication privileges is restricted from communicating with at least a management server but is permitted communication with at least other clients having the lowest level of communication privileges.

16. The wireless LAN device of claim 15, wherein a client with the lowest level of communication privileges has at least one additional restriction on its communication privileges.

17. The wireless LAN device of claim 15, where only a client with a highest level of communication privileges has access to a management server.

18. The wireless LAN device of claim 17, wherein at least one client with pre-registered address information has communication privileges intermediate between the lowest level and the highest level.

19. A communication control method that controls communication in a wireless LAN constructed by connection of multiple clients, said communication control method comprising:
providing registration information to a wireless LAN device operating as an access point of the wireless LAN that includes registration of a specified client among the multiple clients of the wireless LAN as a registered specific client;
receiving at the wireless LAN device a request for communication transmitted from any one of the multiple clients to another client in the wireless LAN;
determining at the wireless LAN device whether or not the request for communication is directed to the registered specified client; and
restricting communication, via the wireless LAN device, to permit the communication to the registered specific client according to a specific protocol used for the communication and to reject the communication according to other protocols so as to limit the communication when it is determined that the request for communication is directed to the registered specified client, and not restricting the communication when it is determined that the request for communication is not directed to the registered specified client but to the other clients;
wherein the restriction of communication between clients within the wireless LAN is based on a protocol used for the communication, the method further including:
(a) if a source MAC address is of the registered specific client, then the communication is permitted without any restrictions; and
(b) if the source MAC address is not of the registered specific client, judging whether a destination IP address if of the registered specific client or not, including:
(1) if the destination IP address is of the registered specific client, the communication is permitted only when the communication is by the permitted protocol; and
(2) if the destination IP address is not of the registered specific client, the communication is permitted without any restrictions.

20. A non-transitory computer readable recording medium storing at least executable computer program code for controlling communication in a wireless LAN constructed by connection of multiple clients, wherein said computer readable recording medium includes:
executable computer code for referring to registration information that includes registration of a registered specified client among the multiple clients of the wireless LAN;
executable computer code for receiving a request for communication transmitted from any one of the multiple clients to another client within the wireless LAN, the communication having an associated protocol for communication;
executable computer code for determining whether or not the request for communication is directed to the registered specified client; and
executable computer code for restricting communication within the wireless LAN based on the protocol to permit the communication to the registered specific client for the protocol being a specific protocol and to reject communications to the registered specific client for other protocols so as to limit the communication when it is determined that the request for the communication is directed to the registered specified client, and not restricting the communication when it is determined that the request for the communication is not directed to the registered specified client; and
the executable computer code for restricting communication adapted to:
(a) if a source MAC address is of the registered specific client, then the communication is permitted without any restrictions; and
(b) if the source MAC address is not of the registered specific client, judging whether a destination IP address if of the registered specific client or not, including:
(1) if the destination IP address is of the registered specific client, the communication is permitted only when the communication is by the permitted protocol; and
(2) if the destination IP address is not of the registered specific client, the communication is permitted without any restrictions.

21. The communication control method in accordance with claim 19, wherein said providing registration information includes registering the specified client with an IP address allocated thereto, and
said determining is carried out with an IP address recorded with the requirement of communication.

22. The communication control method in accordance with claim 19, further comprising:
determining whether or not the client that has transmitted the requirement of communication has been registered in advance, wherein said restricting includes changing a specification of the restriction of the protocol according to a result of the determination.

23. The communication control method in accordance with claim 22, wherein said determining whether or not the client that has transmitted the requirement of communication has been registered in advance is carried out with a MAC address allocated to a network device mounted on the client.

24. The communication control method in accordance with claim 22, wherein said determining whether or not the client that has transmitted the requirement of communication has been registered in advance is carried out with an IP address allocated to the client.

25. The communication control method in accordance with claim 19, further comprising:
when the requirement of communication requests communication to another network, restricting the protocol of the communication so as to limit the communication.

26. The communication control method in accordance with claim 25, further comprising:
determining whether or not the client that has transmitted the requirement of communication has been registered in advance,
wherein said restricting communication includes changing a specification of the restriction of the protocol according to a result of the determination.

27. The communication control method in accordance with claim 19, wherein the restriction of the protocol is implemented by limiting a protocol applicable for communication.

28. The communication control method of claim 19, wherein the wireless LAN device stores at least a MAC address for the registered specific client,
wherein said determining at the wireless LAN device whether or not the request for communication is directed to the registered specified client and said restricting communication respectively includes utilizing at least the MAC address to determine communication privileges in the wireless LAN with a client not having a stored MAC address having the lowest level of communication privileges and a client having a stored MAC address having a higher level of communication privileges.

29. The communication control method of claim 28, wherein a client with the lowest level of communication privileges is restricted from communicating with at least a management server but is permitted communication with at least other clients having the lowest level of communication privileges.

30. The communication control method of claim 29, wherein a client with the lowest level of communication privileges has at least one additional restriction on its communication privileges.

31. The communication control method of claim 29, where only a client with a highest level of communication privileges has access to a management server.

32. The communication control method of claim 31, wherein at least one client with a pre-registered MAC address has communication privileges intermediate between the lowest level and the highest level.

33. The communication control method of claim 19, wherein the wireless LAN device stores at least one type of address information for the registered specific client,
wherein said determining at the wireless LAN device whether or not the request for communication is directed to the registered specified client and said restricting communication respectively includes utilizing the address information to determine communication privileges in the wireless LAN with a client not having stored address information having the lowest level of communication privileges and a client having a stored address having a higher level of communication privileges.

34. The communication control method of claim 33, wherein a client with the lowest level of communication privileges is restricted from communicating with at least a management server but is permitted communication with at least other clients having the lowest level of communication privileges.

35. The communication control method of claim 34, wherein a client with the lowest level of communication privileges has at least one additional restriction on its communication privileges.

36. The communication control method of claim 34, where only a client with a highest level of communication privileges has access to a management server.

37. The communication control method of claim 36, wherein at least one client with pre-registered address information has communication privileges intermediate between the lowest level and the highest level.

* * * * *